United States Patent [19]

Herman et al.

[11] Patent Number: 4,526,839

[45] Date of Patent: Jul. 2, 1985

[54] PROCESS FOR THERMALLY SPRAYING POROUS METAL COATINGS ON SUBSTRATES

[75] Inventors: Herbert Herman, Port Jefferson; Daniel R. Marantz, Port Washington, both of N.Y.

[73] Assignee: Surface Science Corp., Yonkers, N.Y.

[21] Appl. No.: 584,984

[22] Filed: Mar. 1, 1984

[51] Int. Cl.[3] .......................... C23C 7/00; B32B 5/16

[52] U.S. Cl. ...................................... 428/550; 427/34; 427/423; 29/DIG. 39; 101/458; 101/459; 428/937; 428/687; 428/553

[58] Field of Search ............... 428/550, 553, 557, 937, 428/613, 687, 566; 101/458, 459; 427/34, 423, 422, 360; 29/DIG. 39

[56] References Cited

U.S. PATENT DOCUMENTS

| | | | |
|---|---|---|---|
| 2,177,572 | 10/1939 | Kögel | 428/687 |
| 2,181,111 | 11/1939 | Horn | 29/DIG. 39 |
| 2,344,510 | 3/1944 | Hagelin | 101/459 |
| 2,414,923 | 1/1947 | Butcheller | 29/DIG. 39 |
| 2,490,543 | 12/1949 | Robertson et al. | 427/360 |
| 2,637,929 | 5/1953 | Hausman | 101/459 |
| 2,908,068 | 10/1959 | Biel et al. | 427/423 |
| 3,064,114 | 11/1962 | Cresswell et al. | 219/74 |
| 3,086,879 | 4/1963 | Lassiter | 427/422 |
| 3,546,415 | 12/1970 | Marantz | 219/76 |
| 3,642,519 | 2/1972 | Tiner et al. | 117/93.1 |
| 3,775,156 | 11/1973 | Singer | 427/422 |
| 3,781,968 | 1/1974 | Yamagishi et al. | 29/420 |
| 3,808,000 | 4/1974 | Magnotta et al. | 96/35 |
| 3,891,516 | 6/1975 | Chu | 204/33 |
| 4,172,155 | 10/1979 | Pease | 427/34 |
| 4,183,788 | 1/1980 | Fromson et al. | 430/278 |
| 4,232,056 | 11/1980 | Grant et al. | 427/37 |
| 4,269,867 | 5/1981 | Altorfer et al. | 427/37 |
| 4,302,483 | 11/1981 | Altorfer et al. | 427/37 |
| 4,427,500 | 1/1984 | Platzer | 204/33 |
| 4,435,230 | 3/1984 | Fujikura | 148/11.5 A |
| 4,445,998 | 5/1984 | Kanda et al. | 264/385 |

FOREIGN PATENT DOCUMENTS

| | | | |
|---|---|---|---|
| 953708 | 3/1964 | United Kingdom | 101/459 |

*Primary Examiner*—L. Dewayne Rutledge
*Assistant Examiner*—John J. Zimmerman
*Attorney, Agent, or Firm*—David H. Semmes; Warren E. Olsen

[57] ABSTRACT

A process for forming a substantially planar porous metal coating on a substrate which comprises thermal spraying of the metal on the substrate to form a porous metal coating on the substrate, rolling the sprayed coating to render it substantially planar and in the process close the pores, and then removing part of the surface to improve planarity and to reopen the surface-connected pores of the surface. The metal to be sprayed may be in the form of a wire, powder or molten metal mass and be selected from the group consisting of aluminum, zinc, tin, copper, nickel, or their alloys. Preferably, the substrate is selected from the group consisting of steel, aluminum, aluminized or galvanized steel, tin plate, and plastic. The spraying is preferably conducted in a non-oxidizing or reducing atmosphere. Preferably, the coating on the substrate is subjected to cold rolling. Most preferably, the rolling is conducted so as to reduce the coating thickness to approximately half of its original thickness. The coated substrates are useful for a number of purposes, particularly where the substrate metal would not be useful by itself because it does not have the proper physical or chemical properties. The substantially planar porous metal coated substrates are particularly desirable for subsequent coating with other materials, especially organic coatings, because of the "tooth" for the coating provided by the pores of the metal coating on the substrate. The substantially planar porous metal coated substrates of the invention are particularly suited as the base for either a presensitized or "wipe-on" lithographic printing plate.

29 Claims, 4 Drawing Figures

PROCESS FOR THERMALLY SPRAYING POROUS METAL COATINGS ON SUBSTRATES

The invention is concerned with a process for producing substantially planar porous coatings of a metal on a substrate, preferably of another metal.

PRIOR ART

U.S. Pat. No. 3,642,519 discloses a method for imparting wear and corrosion resistance to valve seal surfaces to be used in aerospace fluid systems, which comprises plasma spraying a powdered hard facing alloy onto the metal of the valve seal surfaces. The alloys are generally nickel and cobalt base alloys having a high chromium content. The plasma spray technique uses argon for arc, feed and cover gas. The plasma spray-deposited coating is then fused by vacuum annealing (1) by heating to 1200° to 1600° F., holding for 10 minutes to stabilize temperature, (2) heating to 2140° F. in incremental steps held for 10 minutes, (3) cooling to 1900° F. rapidly, then to 1750° F. in approximately 10 minutes, holding for 60 minutes, and (4) breaking vacuum and rapdily cooling in argon to room temperature.

U.S. Pat. No. 3,781,968 discloses a method for manufacturing a sheet steel coated with a layer of a protective metal, e.g., aluminum, wherein a powder of the metal is coated on the surface of the steel sheet by an unspecified process step, the coated steel sheet is dried and then rolled by means of a rolling mill to form a layer of the protective metal bonded to the surface of the steel sheet. To prevent the powder of the metal from adhering to the surfaces of the rolls, a small quantity of atomized oil is electrostatically applied to the surfaces of the rolling mill, and the applied oil is treated with equalizing rolls to form thin oil films of uniform thickness on the surfaces of the rolls. The oil may be a natural oil, such as a cottonseed oil, or a synthetic oil such as dioctyl sebacate. Mill oil of the aqueous emulsion type may also be used.

U.S. Pat. No. 4,172,155 describes a method for resurfacing of circular-section metal rolls or wheels by weld deposition, wherein a metallic powder is deposited on the surface of the roll or wheel by flame, arc or plasma spraying, fusion-welded and then shaped and compacted while in a plastic condition by a rotatable roll former, which may be engaged with the roll or wheel in order to impart a surface in conformity with the roll former. The powder may consist solely of metal with fluxing agents, or it may incorporate other materials, e.g., oxides or carbides. The powder may be a self-flowing nickel-base iron composition with added chromium, silicon or boron.

U.S. Pat. No. 4,232,056 describes a method for producing porous aluminum boiling surfaces on titanium or stainless steel substrates by a two-step coating process. In the first step, a bond coating of pure aluminum is produced using a thermospray gun to melt an aluminum wire and impinge the molten aluminum particles against the metallic substrate in an inert gas stream projected from the gun nozzle located between 2 and 4 inches from the substrate. The bond coating has a porosity of less than 15 percent and a thickness not greater than 4 mils. The nozzle to substrate distance is then increased to 4 to 10 inches and a top coating of pure aluminum is formed having a porosity greater than 18 percent and a thickness of at least four times the thickness of the bond coating.

SUMMARY OF THE INVENTION

The invention is concerned with a novel improved process and the novel products which can be produced by that process. The novel improved process is concerned with forming a substantially planar metal coating with controlled porosity on a substrate, which comprises thermal spraying of the metal on the substrate to form a porous metal coating on the substrate, rolling the sprayed coating to render it more planar and in the process seal a majority of the surface-connected pores, and then surface finishing the surface to improve planarity and to reopen a majority of the pores to the surface of the coating. The metal to be sprayed may be in any of a variety of forms, e.g., wire, powder or ingot, depending on the thermal spray process employed. The metal to be sprayed may be selected from the group consisting of aluminum, zinc, tin, copper, nickel, and their alloys as well as ferrous alloys. Preferably, the substrate is selected from the group consisting of steel, aluminum, aluminized or galvanized steel, tin plate, and plastic. The spraying is preferably conducted in a non-oxidizing atmosphere, such as nitrogen, or in a reducing atmosphere, such as $NH_x$.

Preferably, the coating on the substrate is subjected to cold rolling. Most preferably, the rolling is conducted so as to reduce the coating thickness to approximately half of its original thickness.

The porous metal coated substrates are useful for a number of purposes, particularly for use where the substrate metal would not be useful by itself because it does not have the proper physical or chemical properties. The novel coated substrates of this invention are useful as planographic substrates and more particularly useful for subsequent coating with other materials, especially organic coatings, because of their highly absorbent properties for certain fluids and chemicals, having the correct surface energy match to achieve wettability ("tooth") for the coating provided by the pores of the metal coating on the substrate. The planographic porous metal coated substrates of the invention are particularly suited as the base for either a presensitized or "wipe-on" lithographic printing plate.

DESCRIPTION OF THE PREFERRED EMBODIMENTS

The metal to be sprayed onto the substrate is preferably selected from the group consisting of aluminum, zinc, tin, copper, nickel, and their alloys. Preferably, the substrate is selected from the group consisting of steel, aluminum, aluminized or galvanized steel, and plastic.

Figure 1:
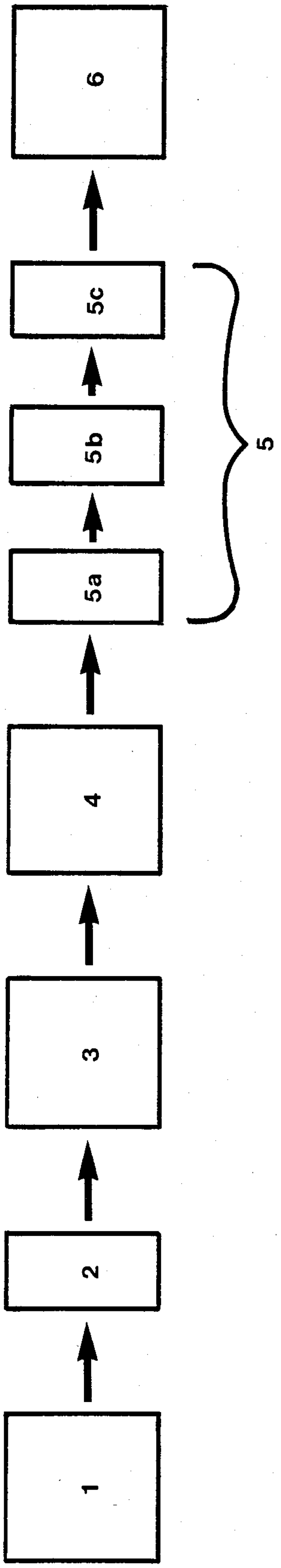
FIG. 1 is a schematic plan for a preferred continuous process of this invention.

In general, the substrate material (e.g., steel) can be introduced into the preferred continuous process of the invention in the form of coils, typically 10 to 36 inches in width. The coil is fed into the system line from a conventional unwind mechanism (FIG. 1, No. 1). Preferred substrates range from about 0.006 to about 0.010 inches (about 150 to about 250 microns) in thickness.

Depending on the choice of substrate and its surface condition, it may be necessary or preferable to clean or precondition the substrate in order to increase the adhesion of the porous metal coating to the substrate. In some cases, steel, for example, is received from the mill with a thin film of protective oil on its surfaces. Of course, it would be desirable to preclean the steel substrate to remove the oil or to simultaneously clean and thermal spray coat the steel substrate. To achieve cleaning, to enhance adhesion bond strength and to improve deposition efficiency, it is desirable to preheat the substrate just prior to thermal spraying (FIG. 1, No. 2). The preheating can be achieved preferably by flame to obtain a chemical decomposition of any oil films on the surface of the substrate. The flame can be formed by combustion gases. The temperature of the preheating of the steel substrate should preferably be at least about 500° F. The spraying is preferably conducted in the absence of corrosion promoting atmosphere, e.g., in a nitrogen atmosphere or in a reducing atmosphere, e.g., $NH_x$, in order to minimize possible corrosion of the substrate, which could interfere with the bonding of the porous coating to the substrate.

The thermal spray process (FIG. 1, No. 3) for forming the porous metal coating on the surface of the substrate may utilize the flame, two-wire electric arc, or the molten metal electric arc method. For reasons of economy, the molten metal electric arc method is preferred.

In the fame spray method, the metal for the coating may be fed into the spray apparatus in the form of powder or wire.

The two-wire electric arc method of thermal spraying to produce the porous metal coating on the substrate is generally described in U.S. Pat. No. 3,546,415 of Daniel R. Marantz, entitled "Electric Arc Metallizing Device."

The molten metal arc method of thermal spraying to produce the porous metal coating on the substrate is generally described in U.S. Pat. Nos. 4,269,867 and 4,302,483 of Kenneth E. Altofer and Daniel R. Marantz, each entitled "Metallizing of a Corrodible Metal with a Protective Metal."

If the width of the substrate passing under the thermal spraying stage is too wide to be relatively uniformly coated with the coating by one spray device, then a series of spray devices can be utilized across the width of the substrate, arranged so that the spray patterns produced do result in a relatively uniform coating across the width of the substrate.

Typical electric-arc spray parameters are given in Table 1.

TABLE 1

| Table of Electric-Arc Spray Parameters | | |
|---|---|---|
| Condition | Useful Range | Preferred |
| Arc Current (D.C.) | 25 to 600 amps. | 75 amps. |
| Arc Voltage (D.C.) | 19 to 30 volts | 23 volts |
| Atomizing Gas | Air, nitrogen, $NH_x$ | Air |
| Atomizing Gas Pressure | 40 to 120 p.s.i. | 80 p.s.i. |
| Wire Diameter | 0.035 to 0.062 inches | 0.035 inches |
| Spray Distance | 2 to 12 inches | 9 inches |
| Spray Angle | 60 to 120 degrees | 90 degrees |
| Gun Traverse Rate | 2 to 50 surface-feet/minute | 10 surface-feet/minute |

TABLE 1-continued

| Table of Electric-Arc Spray Parameters | | |
|---|---|---|
| Condition | Useful Range | Preferred |
| Surface Temperature | Room temperature to 900° F. | 550° F. |
| Coat Thickness | 0.001 to 0.010 inches | 0.003 inches |

To achieve the desired substantially planographic surface of the porous metal coating on the substrate, the coating is rolled (FIG. 1, No. 4). Preferably, the coating on the substrate is subjected to cold rolling. Rolling increases the bond between the coating and substrate and also smooths the surface by closing the pores. Preferably the process employs means for adjusting the rolling pressure. Most preferably, the rolling is conducted under sufficient pressure to reduce the coating thickness down to approximately half of its original as-deposited thickness or less. The root mean square (RMS) of the amplitude, or height, of the surface coating as-deposited can range from about 250 to about 350 microinches. After rolling, the RMS can range from about 90 to about 150 microinches.

The next step in the process is to surface finish the rolled coating (FIG. 1, No. 5). This process, which may be multistaged, initially involves removing a minor amount of coated material (FIG. 1, No. 5*a*), followed by a smoothing stage (FIG. 1, No. 5*b*) and subsequent final finishing stages (FIG. 1, No. 5*c*). Surface finishing increases surface smoothness and reopens pores which have been closed by the rolling stage, giving increased surface porosity, which can be controlled for the intended application of the novel porous metal coated substrates of the invention. The various methods of surface finishing may employ abrasives in either wet or dry rubbing or brushing operations. The degree of porosity of the coated, rolled and finished product of the process described in this invention is estimated at from about 8 to about 15 volume percent porosity. Additional surface modifications may be required and can be accomplished by further stages. Such further surface modification may be carried out as required by the specific intended application of the porous-metal coated plate. The finished product is then rewound (FIG. 1, No. 6) by a conventional rewind mechanism.

Figure 2:
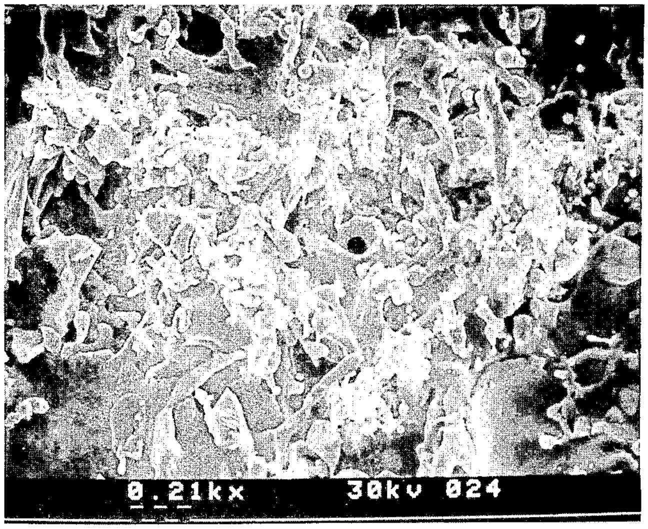
FIG. 2 is a scanning electron micrograph at 210X magnification of the top surface of an as-spray-coated porous aluminum coating of this invention on a steel substrate.
Figure 3:
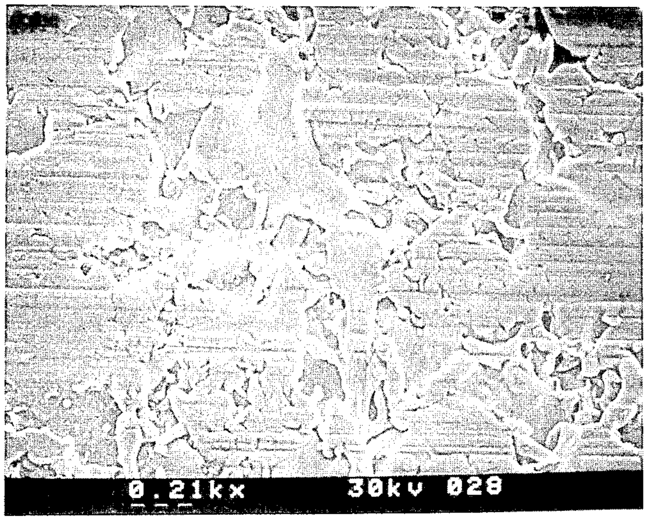
FIG. 3 is a scanning electron micrograph at 210X magnification of the top surface of the spray-coated porous aluminum coating shown in FIG. 2 after rolling.
Figure 4:
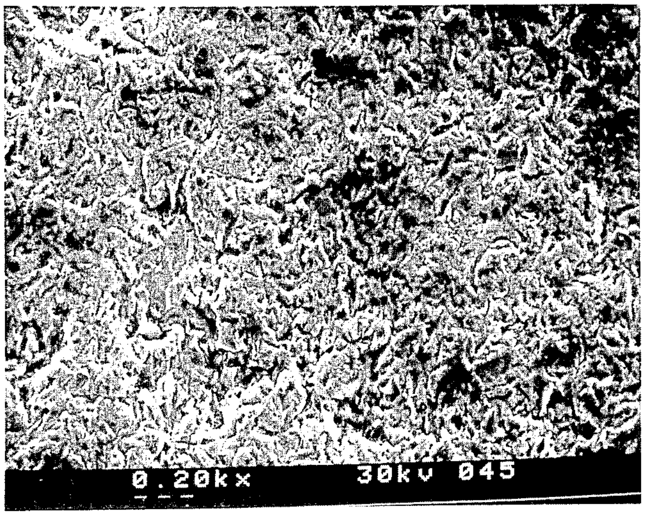
FIG. 4 is a scanning electron micrograph at 200X magnification of the top surface of the spray-coated porous aluminum coating shown in FIG. 2 after rolling and subsequent surface finishing.

Detailed scanning electron microscope (SEM) examinations of the coated and treated surfaces are shown in FIGS. 2 to 4. FIG. 2 shows a 210X SEM top view of the as-spray-coated surface, indicating the high degree of roughness and numerous projections which formed during the process of solidification. FIG. 3 is a 210X SEM top view after the coating was rolled. FIG. 3 shows that after rolling the surface-connected porosity (i.e., that porosity open to the surface) is severely diminished, and the high points of the coating are flattened, showing overall compression of at least the topmost regions of the coating. Rolling marks are apparent, which replicate the machinery marks of the rolls.

During the surface finishing stage, the very top of the coating surface was removed, revealing a very high degree of porosity comprised of extremely fine pores, as illustrated in the FIG. 4 SEM (200X). This porosity provides the metallic coating with an essential high absorption capability for coatings, making it wettable by a large class of liquid organic and inorganic compositions. It is this porosity which makes possible the improved utility of the porous-metal coated substrates of this invention for specific applications requiring such surface porosity.

To confirm that the porosity of the metal coatings of the invention is, in fact, maintained and is open to the outer surface following the finishing stage, an etched cross-section SEM of the coating-substrate was prepared. From the SEM, individual pores and pores which are connected directly to the surface were apparent. An SEM of an unetched cross-section also indicated the excellent quality of the interface between coating and substrate. It was apparent that the interface was well bonded and clean and essentially free of interfacial particles or major discontinuities, implying a strong and integral mechanical bond between coating and substrate.

The planographic porous metal coated substrates of this invention are useful for a number of applications, particularly where the substrate metal would not be useful by itself because it does not have the proper physical or chemical properties. The planographic porous metal coated substrates are particularly useful for subsequent coating with other materials, especially organic coatings, because of the "tooth" for the coating provided by the pores of the metal coating on the substrate.

The planographic porous metal coated substrates of the invention are particularly suited as the base for a "wipe-on" lithographic printing plate. As is known in the lithographic printing art, "wipe-on" lithographic printing plates are prepared by wiping onto a sheet of aluminum a coating of a light-sensitive composition, usually a diazo-based composition. The planographic coated substrates of the invention are exceptionally useful as the base for a presensitized lithographic printing plate. Presensitized lithographic printing plates made with the planographic porous metal coated substrates of this invention are the subject of concurrently filed patent application Ser. No. 584,985 of Gregory Halpern, Herbert Herman and Daniel Richard Marantz, entitled "Improved Lithographic Printing Plate." The porous metal coating on the substrate has "tooth" for the sensitized coating and is able to attract the aqueous fountain solution when the exposed and developed lithographic printing plate is used to print.

EXAMPLE 1

Aluminum wire was electric-arc sprayed according to the preferred parameters given in TABLE 1, onto properly prepared sheet steel approximately 0.007 inches (175 microns) in thickness. The arc-sprayed aluminum coating was 0.003 inches (about 75 microns) thick and had a roughness on the order of 250 to 350 microinches RMS. The surface was rolled to close pores and to reduce high surface profile (i.e., to decrease apparent surface RMS roughness). After rolling, the roughness was approximately 120 microinches RMS. The coating was then finished initially using 200 grit abrasive, followed by 600 grit, to remove the residual high points and to reopen pores. An RMS level of 10 to 30 microinches was achieved using this technique.

The novel porous aluminum coated steel substrates of this invention may be used as the substrates for "wipe-on"0 and presensitized lithographic printing plates. When used as the base for a sensitized lithographic printing plates, the novel porous aluminum coated steel substrates of this invention benefit from improved fatigue properties (above and beyond the mechanically grained and anodized all-aluminum sheet that is now generally employed as a base for lithographic printing plates), improved creep properties (as the term "creep" is used in the lithographic printing industry), and generally improved mechanical properties. Also, the surface-treated aluminum-coated steel, as discussed above, has a texture and controlled micro-porosity which enhance fountain solution carrying capacity as required in lithography. In addition, due to the rapid solidification which occurs during the spray deposition of the molten aluminum on the steel substrate, the aluminum coating is composed of ultrafine-grained material (one micron average diameter). This rapidly solidified material has greatly enhanced strength features, and this will enable longer-term use of such coated steels where significant mechanical wear occurs during such use.

EXAMPLE 2

When EXAMPLE 1 is repeated using aluminum sheet instead of steel as the substrate, there is produced a porous aluminum coated aluminum substrate suitable for use in making a planographic printing plate.

EXAMPLE 3

When EXAMPLE 1 is repeated using zinc wire instead of aluminum wire as the metal for forming the coating, there is produced a porous zinc coated steel substrate suitable for use in making a planographic printing plate.

What is claimed is:

1. A process for forming a substantially planar porous metal coating on a substrate which comprises thermal spraying of the metal on the substrate, rolling the sprayed coating to render it substantially planar but thereby closing some of the pores, and then surface finishing part of the surface to improve planarity and to reopen some of the pores of the coating.

2. A process as claimed in claim 1 in which the metal to be sprayed is in the form of a wire.

3. A process as claimed in claim 1 in which the metal to be sprayed is in the form of molten metal.

4. A process as claimed in claim 1 in which the metal to be sprayed onto the substrate is selected from the group consisting of aluminum, zinc, tin, copper, nickel, and their alloys, and ferrous alloys.

5. A process as claimed in claim 1 in which the substrate is selected from the group consisting of steel, aluminum, aluminized steel, galvanized steel, tin plate, and plastic.

6. A process as claimed in claim 1 in which the substrate is introduced into the process from a coil.

7. A process as claimed in claim 1 in which the surface of the substrate is cleaned prior to or contemporaneously with its being thermally spray-coated.

8. A process as claimed in claim 1 in which the surface of the substrate is cleaned by heating to temperature of at least about 500° F.

9. A process as claimed in claim 1 in which the thermal spraying step utilizes the flame, two-wire electric arc, or molten metal electric arc thermal spray method.

10. A process as claimed in claim 1 in which the spraying is conducted in a non-oxidizing atmosphere.

11. A process as claimed in claim 1 in which the spraying is conducted in a chemically reducing atmosphere.

12. A process as claimed in claim 1 in which the coating on the substrate is subjected to cold rolling.

13. A process as claimed in claim 1 in which the rolling is conducted so as to reduce the metal coating thickness to approximately half of its original thickness.

14. A process as claimed in claim 1 in which the rolling is conducted so as to reduce the roughness root mean square height of the metal coating to a range of from about 90 to about 150 microinches.

15. A process as claimed in claim 1 in which the removal of part of the surface utilizes abrasives brushed against the surface.

16. A process as claimed in claim 1 in which the thermal spraying is accomplished by electric-arc spraying with arc current at from about 25 to about 600 amps. D.C. and with arc voltage of from about 19 to about 30 volts D.C.

17. A process as claimed in claim 1 in which the atomizing gas is selected from the group consisting of air, nitrogen and $NH_x$ and is used at a pressure of from about 40 to about 120 p.s.i.

18. A process as claimed in claim 1 in which the metal to be sprayed is in the form of a wire with a diameter of from about 0.035 to about 0.062 inches.

19. A process as claimed in claim 1 in which the origin of the spray is from about 2 to about 12 inches from the surface the substrate to be coated and the angle of the spray to the surface of the substrate is from about 60 to about 120 degrees.

20. A process as claimed in claim 1 in which the the spray gun traverses the surface of the substrate at a rate of from about 2 to about 50 surface-feet/minute.

21. A process as claimed in claim 1 in which the temperature of the substrate to be coated is from about room temperature to about 900° F.

22. A process as claimed in claim 1 in which the process is conducted in such a manner as to form a spray coating of from about 0.001 to about 0.010 inches.

23. A substantially planar porous metal coated substrate which comprises a substrate, a thermal spray coating of the metal on the substrate, rolled so as to render the sprayed coating substantially planar, and then part of the surface removed to improve planarity and to reopen some of the pores of the coating.

24. A substantially planar porous metal coated substrate as claimed in claim 23 in which the metal coating is selected from the group consisting of aluminum, zinc, tin, copper, nickel, and their alloys.

25. A substantially planar porous metal coated substrate as claimed in claim 23 in which the substrate is selected from the group consisting of steel, aluminum, aluminized steel, galvanized steel, and plastic.

26. A substantially planar porous metal coated substrate as claimed in claim 23 in which the coating on the substrate has been subjected to cold rolling.

27. A substantially planar porous metal coated substrate as claimed in claim 23 in which the coating has been rolled so as to reduce the metal coating thickness down to approximately half of its as-sprayed thickness.

28. A substantially planar porous metal coated substrate as claimed in claim 23 in which the coating has a roughness root mean square height of from about 10 to about 30 microinches.

29. A substantially planar porous metal coated substrate as claimed in claim 23 in which the coating has a porosity of from about 8 to about 15 volume percent.

* * * * *